PHOTOCONDUCTIVE MATRIX SWITCHING PLUGBOARD

Filed June 8, 1959 2 Sheets-Sheet 1

INVENTOR.
ARTHUR J. CRITCHLOW

BY Richard E. Cummins

ATTORNEY

United States Patent Office 3,191,040

Patented June 22, 1965

3,191,040
PHOTOCONDUCTIVE MATRIX SWITCHING PLUGBOARD

Arthur J. Critchlow, Los Gatos, Calif., assignor to International Business Machines Corporation, New York, N.Y., a corporation of New York Filed June 8, 1959, Ser. No. 818,691
4 Claims. (Cl. 250—209)

This invention relates in general to matrix switching devices for selectively interconnecting a plurailty of circuits in a plurality of different arrangements and in particular to an improved light responsive matrix switching device.

Various situations arise where it is desirable to interconnect one plurality of circuits with another plurality of circuits and then at some subsequent time, to reconnect the circuits in a completely different arrangement. Such a situation exists in many present day data processing machines wherein basic functional components of the machine are interconnected in one specific manner by a conventional plugboard in accordance with the sequence of operations to be performed by the machine and then at a subsequent time reconnected in a completely different manner for another operation by inserting a new prewired plugboard or rewiring the original plugboard. The versatility of the machine and its adaptability to perform various data processing applications of course increases with the number of circuits that may be selectively interconnected. In addition to increasing versatility the use of plugboards permits certain functional components of a machine to perform different operations at different times thereby eliminating a certain amount of structural redundancy in the machine.

However, with plugboards suggested in the prior art a practical limit is reached in that the number of plug wires and hubs on the plugboard becomes excessive thereby complicating the task of plug wiring the machine in addition to increasing the physical size of the machine. A need therefore exists for a compact plugboard which may be changed or rewired very rapidly.

Additionally, it has been realized that much of the logical circuitry in present day processing machines, such as computers, is used quite ineffectively. One reason for this is, that with conventional plugboard techniques the cost, for example, of providing an additional logical unit to perform a specific function compared to employing selective switching of an existing unit through a conventional plugboard is under most circumstances more economical. As a result, considerable physical space in a computer is devoted to logical units which are used a comparatively small portion of the machine operating time.

In accordance with the present invention, a compact inexpensive readily changeable plugboard is obtained by providing a light responsive photoconductive matrix switching device. The matrix device comprises a first set of transparent conductors and a second set of conductors disposed orthogonally to the first set and separated therefrom by a layer of photoconductive material whose resistance transverse to the layer may be lowered substantially by subjecting the portion of the layer at any intersection of conductors to a beam of light. The first set of conductors may be connected to one plurality of circuits, and the second set of conductors may be connected to a second plurality of circuits so that the first and second plurality of circuits may be interconnected in a number of different arrangements selectively in rapid sequence merely by projecting different light patterns onto the matrix.

It is therefore an object of the present invention to provide an improved multiple circuit switching arrangement.

Another object of the present invention is to provide a compact plugboard type unit.

A further object of the present invention is to provide an improved light responsive switching matrix.

A still further object of the present invention is to provide a switching arrangement which allows more economical use of logical units in a data processing machine.

Other objects of the invention will be pointed out in the following description and claims and illustrated in the accompanying drawings which disclose, by way of example, the principle of the invention and the best mode which has been contemplated of applying that principle.

Figures 5, 6A, 6B, 6C, 7A, 7B, 7C:
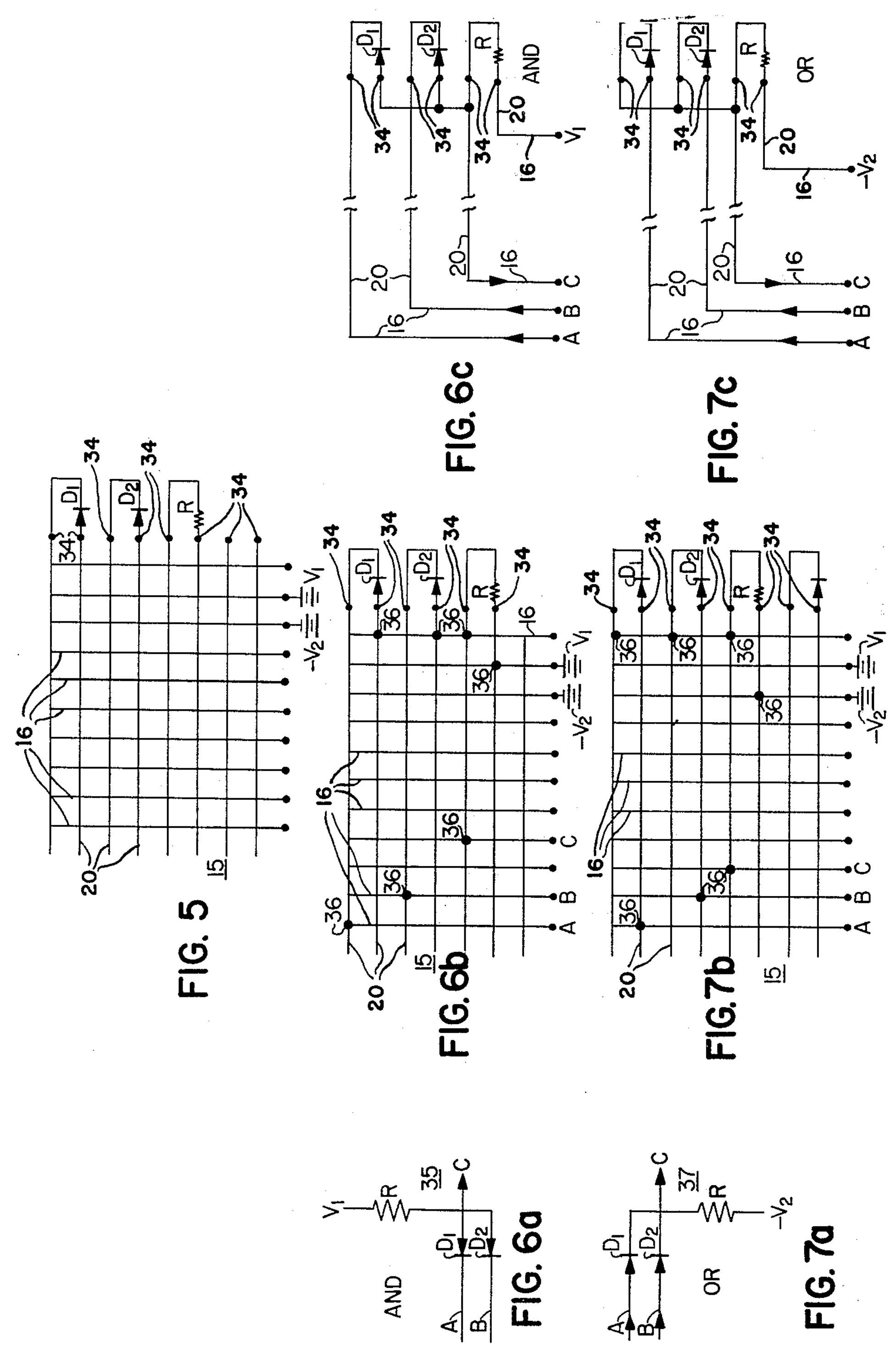
FIG. 5 is a schematic illustration of the arrangement shown in FIG. 4 for performing logical operations.

FIGS. 6*a* through 6*c* are views illustrating schematically the arrangement shown in FIG. 5 arranged to perform a logical AND operation;

FIGS. 7*a* through 7*c* are views similar to FIGS. 6*a* through 6*c* illustrating schematically how the arrangement shown in FIG. 5 provides a logical OR operation.

Figure 3:
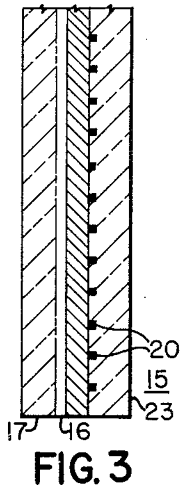
FIG. 3 is a partial sectional view of the switching matrix shown in FIG. 1 taken along the line III—III.
Figure 1:
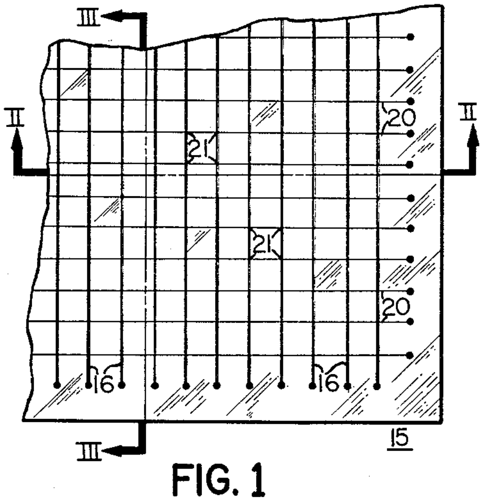
FIG. 1 is an enlarged plan view of a portion of light responsive swtiching matrix embodying the present invention.
Figure 2:
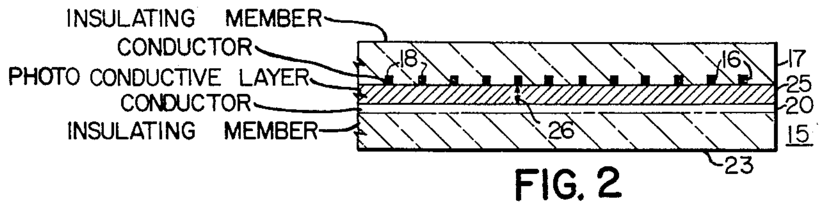
FIG. 2 is a partial sectional view of the switching matrix shown in FIG. 1 taken along the line II—II.

Referring to the drawings and particularly to FIGS. 1 through 3, the photoconductive matrix 15 shown therein comprises a plurality of transparent conductors 16 which are disposed in parallel spaced relationship to each other. The transparent conductors 16 are preferably, but not necessarily, maintained in their parallel relationship by being imbedded in a transparent insulating block 17 provided with suitable complementary grooves 18. The photoconductive matrix 15 further includes a second plurality of conductors 20 which are disposed in parallel relationship to each other and arranged orthogonally with respect to the first set of conductors 16 so as to define a plurality of intersections or matrix points 21. An insulating block 23 similar to the insulating block 17 employed with the transparent conductors 16 may be employed to maintain the conductors 20 in their proper relationship.

The transparent conductors 16 are separated from the orthogonally related conductors 20 by a layer of photoconductive material 25. A photoconductive material suitable for this layer may be composed of cadmium selenide which has a ratio of dark-to-light resistance of 1,000 to one. Stated somewhat differently, the resistance between a transparent conductor 16 and an orthogonally related conductor 20 at a matrix point 21 when the intersection is not lighted is in the neighborhood of 10,000,000 ohms, while on the other hand with the intersection subjected to a beam of light, this resistance decreases to approximately 10,000 ohms. It will thus be seen by reference to FIGS. 1 through 3, that any of the transparent conductors 16 may be selectively interconnected to one or more of the conductors 20 merely by projecting a beam of light through the transparent conductor 16 at the intersection, so that the light impinges on the portion of the photoconductive layer 25 separating the two conductors thereby lowering the resistance of the layer in a transverse direction indicated by the two-headed arrow 26 in FIG. 2. If desired portions of the layer may comprise photoconductive material treated in accordance with known methods so that these portions conduct current in only one direction. Such material is referred to in the art as photodiode material.

Figure 4:
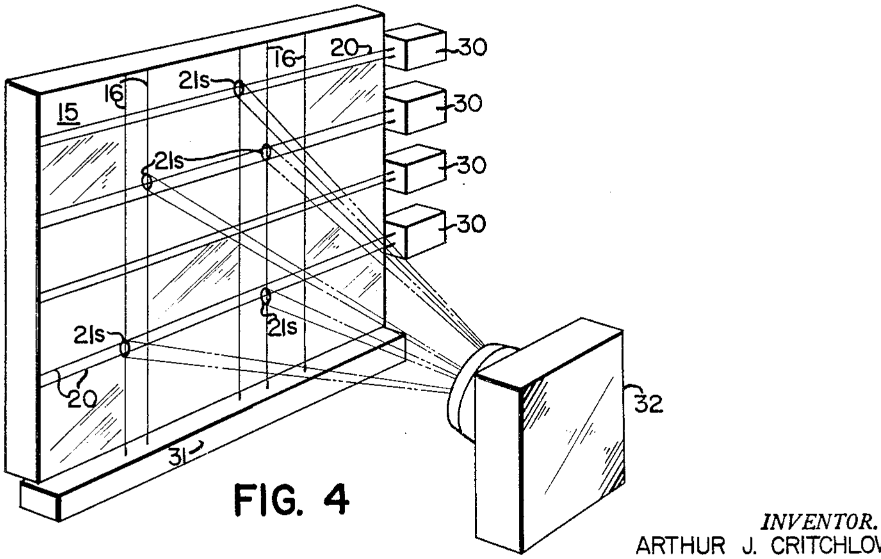
FIG. 4 is a view illustrating schematically how the photoconductive matrix may be embodied as a simple computer.

FIG. 4 illustrates diagrammatically how the photoconductive switching matrix 15 may be employed in a manner similar to a conventional plugboard. In FIG. 4 one set of conductors 20 are connected to various logical units 30 while the other set of conductors 16 which are transparent are connected to input and output circuits 31 for supplying signals to, and receiving signals from, the logical units 30 in accordance with a prescribed plan. A particular light pattern projected to selected matrix points 21*s* from the light pattern generator 32 causes certain input and output units 31 to be connected to the logical units 30. The portion of the photoconductive layer 25 disposed between a transparent conductor 16 and conductor 20 corresponds to the plug wires of a conventional plugboard while the conductors 16 and 20 of the matrix correspond to hubs of a conventional plugboard.

The operation of the photoconductive matrix 15 may be seen with reference to FIGS. 5 through 7 wherein a pair of diodes D1 and D2, and a resistance R are connected across terminals 34 of pairs of output conductors 20, and sources of positive and negative voltage represented by batteries V1 and —V2, respectively, are connected to transparent conductors 16. The arrangement shown in FIG. 5 performs an AND function or an OR function depending upon the particular light pattern projected on the matrix 15. For example, in FIG. 6*a*, there is illustrated a conventional diode logical AND circuit 35 for providing an output signal C only when signals A and B are present. FIG. 6*b* illustrates the matrix shown in FIG. 5 subjected to a light pattern comprising beams of light impinging at the intersections designated by the darkened circles 36. FIG. 6*c* is a view similar to FIG. 6*b* illustrating only those conductors 16 and 20 which are called into operation by the action of the light pattern. The circuit of FIG. 6*c* is identical to FIG. 6*a* and functions as a conventional AND circuit for ANDING signals A and B.

FIG. 7*a* illustrates a conventional diode logical OR circuit 37 for providing an output signal C whenever signals A or B are present. FIG. 7*b* illustrates the photoconductive matrix 15 of FIG. 5 subjected to a light pattern different than that shown in FIG. 6*b* for causing the OR operation. FIG. 7*c* is a view similar to FIG. 7*b* illustrating only those conductors 16 and 20 which are called into operation by the action of the light pattern. The logical OR circuit of FIG. 7*c* is identical to that of FIG. 7*a*.

The light pattern generator 32 has been illustrated diagrammatically in block form in FIG. 4, in that any suitable device known in the art may be employed. For example, a light pattern generator in which the pattern is recorded on microfilm and projected through conventional optical devices onto the matrix may be used.

While a rather simple example has been chosen to illustrate the invention, it will of course be realized by those skilled in the art that the basic concept may be extended to more advanced circuits employing a greater number of logical units, such as, half-adders, adders and electronic commutators, etc. in that all logical operations can be performed by combining the three logical operations AND, OR and NOR in multiple combinations.

While there have been shown and described and pointed out the fundamental novel features of the invention as applied to the preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A system for sequentially performing different logical operations employing at least one common polarity-dependent current conducting device comprising in combination a first plurality of conductors, a second plurality of conductors orthogonally disposed with respect to said first plurality of conductors creating a plurality of intersections, one plurality of said conductors being transparent, a layer of photoconductive material disposed between said first and second plurality of conductors with opposite surfaces in contact with said first and second plurality of conductors respectively, a plurality of two terminal polarity-dependent current conducting devices, means connecting the respective terminals of each device to a different pair of conductors of one of said plurality of conductors, at least one pair of signal input circuits, at least one signal output circuit, means connecting said circuits to different conductors of said other plurality of conductors, and means for illuminating a first selected group of said intersections to thereby interconnect conductors of one surface with respective conductors on the opposite surface to cause said input circuits to be connected to said output circuit through said layer and said devices in a first predetermined manner and for illuminating a second selected group of said intersections to thereby cause said input circuits to be connected to said output circuit through said layer and said devices in a second predetermined manner.

2. An optically manipulatable logic system for interconnecting polarity-dependent current conducting devices according to a light pattern superposed upon orthogonal matrices of parallel conductors, said device comprising in combination:

a first plurality of conductors;

a second plurality of conductors orthogonally disposed with respect to said first plurality of conductors creating a plurality of intersections, at least one of said plurality of conductors being transparent;

a layer of photoconductive material disposed between said first and second plurality of conductors with opposite surfaces in contact with said first and second plurality of conductors at said intersections;

a plurality of two terminal polarity-dependent solid state current-gating devices;

means connecting the respective terminals of each of said devices between a different pair of conductors in one of said plurality of conductors;

at least one pair of signal input circuits;

at least one signal output circuit;

means connecting said circuits to different conductors in the other said plurality of conductors; and means for causing selective illumination of said intersections to interconnect conductors along one surface with selected coductors along the opposite surface of said material at the illuminated junctions to effect connection of said input circuits to selected terminals of selected ones of said devices, and of said output circuit to selected terminals of selected ones of said devices in a plurality of selectable predetermined ways.

3. A system for sequentially performing different logical operations, employing optical connection signals, said system comprising in combination:

a first plurality of conductors;

a second plurality of conductors orthogonally disposed with respect to said first plurality of conductors creating a plurality of intersections, one plurality of said conductors being transparent;

a layer of photoconductive material disposed between said first and second plurality of conductors with opposite surfaces in contact with said first and second plurality of conductors at said intersections;

a plurality of two terminal diode devices;

means connecting the terminals of each said device between a different pair of conductors in one of said plurality of conductors;

at least one pair of signal input circuits;

at least one signal output circuit;

means connecting said circuits to different conductors of said other plurality of conductors; and means for illuminating selected ones of said intersections to interconnect conductors along one surface of said material with selected conductors on the opposite surface thereof to cause said input circuits to be connected to said output circuit by way of selected ones of said devices in a plurality of selectable predetermined ways.

4. An optically manipulatable diode-logic system wherein diode-logic may be optically fabricated, said system comprising in combination:

at least one diode device, each device including two terminal connectors;

at least one power supply conductor disposed adjacent said terminal connectors so as to cross at least one of said connectors and remain spaced therefrom to thereby form selected first junctions therewith;

at least one signal output conductor disposed adjacent said terminal connectors so as to cross at least one of said connectors and remain spaced therefrom to thereby form selected second junctions therewith;

a plurality of input conductors disposed adjacent said terminal connectors so as to cross at least one of said connectors and remain spaced therefrom to thereby form selected third junctions therewith;

photoconductive means disposed intermediate said conductors and connectors at said junctions; and optical signal projection means adapted to project selected patterns of light signals upon said photoconductive means only at selected ones of said junctions and thereby arrange and rearrange the same elements of the diode-logic, thus effecting multiple use of logic elements conveniently.

References Cited by the Examiner

UNITED STATES PATENTS

| | | | |
|---|---|---|---|
| 2,342,245 | 2/44 | Bruce et al. | 250—208 X |
| 2,727,685 | 12/55 | Wilson | 235—61.115 |
| 2,732,469 | 1/56 | Palmer | 250—213 X |
| 2,768,310 | 10/56 | Kazan et al. | 250—211 |
| 2,789,193 | 4/57 | Anderson | 250—213 |
| 2,818,531 | 12/57 | Peek | 313—108 X |
| 2,892,094 | 6/59 | Lehovec | 250—211 |
| 2,905,830 | 9/59 | Kazan | 313—108 |
| 2,912,592 | 11/59 | Mayer | 250—211 X |
| 2,915,641 | 12/59 | Rothschild | 250—213 |
| 3,046,540 | 7/62 | Litz et al. | 250—213 |

FOREIGN PATENTS 1,145,946 5/57 France.

OTHER REFERENCES

Keller: IBM Technical Disclosure Bulletin; vol. 1, No. 1; June 1958; page 38.

RALPH G. NILSON, *Primary Examiner*.

RICHARD M. WOOD, MAX L. LEVY, WALTER STOLWEIN, *Examiners*.